Patented Aug. 30, 1932

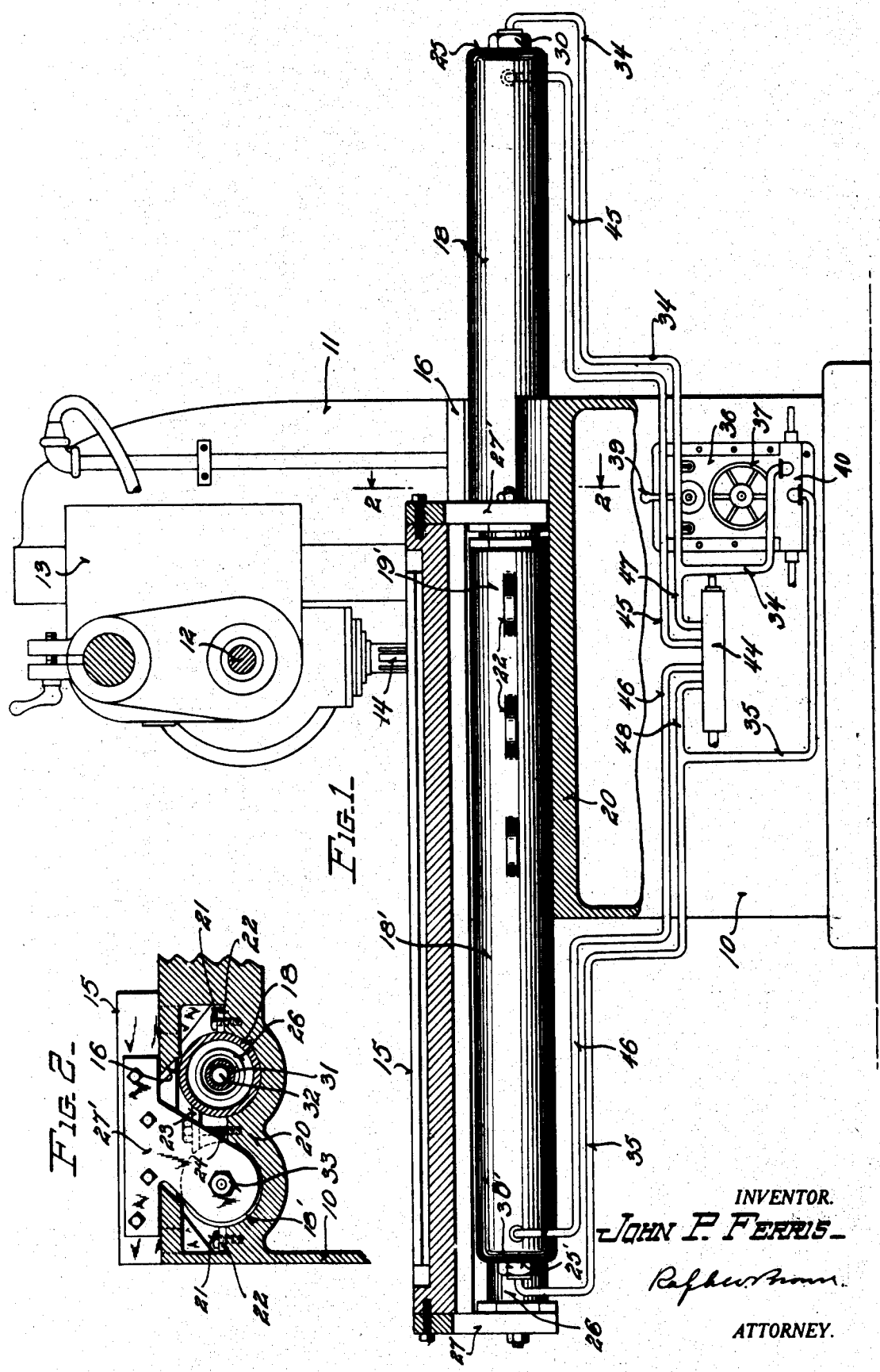

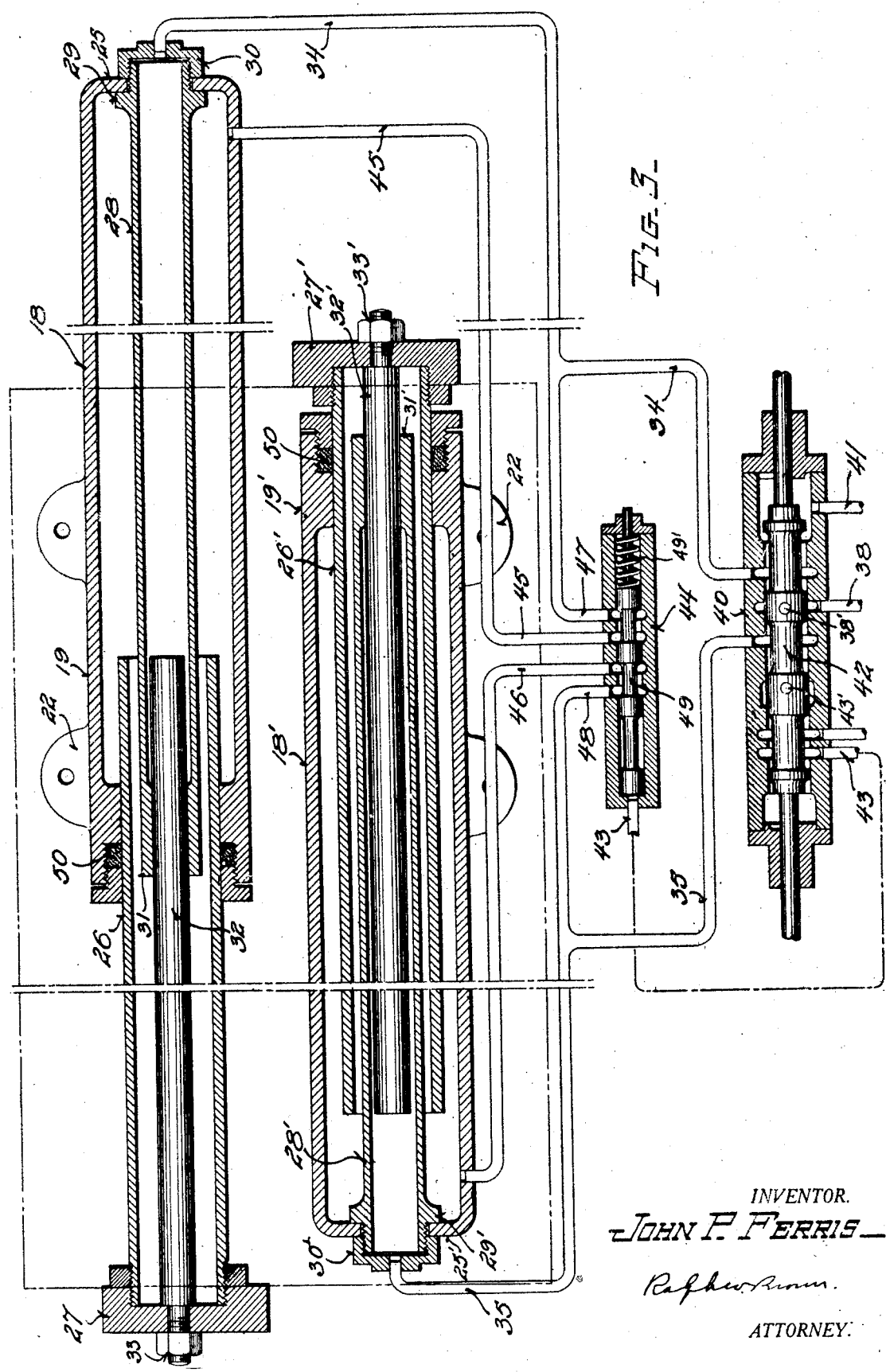

1,874,265

UNITED STATES PATENT OFFICE

JOHN P. FERRIS, OF MILWAUKEE, WISCONSIN, ASSIGNOR TO THE OILGEAR COMPANY, OF MILWAUKEE, WISCONSIN, A CORPORATION OF WISCONSIN

HYDRAULIC TABLE DRIVE FOR MILLING MACHINES AND THE LIKE

Application filed September 19, 1927. Serial No. 220,380.

This invention relates primarily to milling machines, and particularly to table drives therefor, although certain novel features thereof may be advantageously applied to other types of machine tools and the like.

The copending application of Walter Ferris, Serial No. 199,936, filed June 20, 1927, now Patent Number 1,866,348, granted July 5, 1932, discloses a hydraulic drive for milling machine tables possessing certain novel and advantageous characteristics. In the milling machine therein described the table is driven by two selectively excited hydraulic rams supplied with driving liquid from a positive flow smooth delivery pump connected thereto through a closed hydraulic circuit. Each ram is connected to both ends of the table and the opposite ends of each ram are of equal volumetric capacities so that, in both directions of motion, the pump receives as much liquid from the discharge end of each ram as it supplies to the receiving end thereof. A so-called non-differential circuit is thus provided which possesses certain important advantages. With the rams arranged and connected in the manner disclosed in that application however, the extent of permissible table movement is rather short as compared with the overall working space occupied by the machine.

One object of the present invention is the provision of a hydraulic drive for reciprocating tables and the like which will permit a greater table movement within a given operating space without sacrificing the important advantages of the drive mechanism described in said application.

Another object is the provision of a hydraulic drive mechanism of the character mentioned which will be capable of economic manufacture.

Other more specific objects and advantages will appear from the following description of an illustrative embodiment of the present invention.

In the drawings:—

Figure 1 is a front elevation, partly in section, of a milling machine equipped with a hydraulic drive constructed in accordance with the present invention.

Fig. 2 is a fragmentary sectional view taken substantially along the line 2—2 of Figure 1.

Fig. 3 is a diagrammatic view illustrating the hydraulic circuit, and including a horizontal section view of the rams.

The milling machine selected for illustration is of a well known type and includes a base frame 10 having a rigid column 11 rising from the rear portion thereof. The usual cutter spindle 12 is carried by a head 13 mounted for vertical adjustment upon the column 11 in a well known manner. The spindle 12 is driven through appropriate gearing within the head 13 from the usual splined vertical shaft 14 designed to effect operation of the spindle 12 in all positions of the head. The work supporting table 15 is mounted for lengthwise travel within the usual ways 16 formed in the top of the frame 10, forwardly of the column 11 and beneath the spindle 12. Since the parts thus far mentioned do not differ fundamentally from the corresponding parts of standard or commercial forms of milling machines, a further or more detailed description thereof is deemed unnecessary.

The table drive mechanism however is believed to be new. In the machine shown it comprises two compound telescopic rams firmly anchored in staggered overlapping relation in the main frame 10 below the table 15. The rams are similarly constructed but oppositely disposed. Each includes a main cylinder 18—18' seated at its inner end 19—19' upon an appropriate bridge piece 20 formed in the frame 10 and to which each is removably fixed by appropriate screws 21, passing through ears 22, projecting laterally therefrom. A clamp plate 23, disposed between the cylinders and removably anchored by screws 24, serves as additional securing means for the cylinders. The outer ends 25—25' of the cylinders 18—18' are closed and project in opposite directions from the main frame 10 to points preferably somewhat within the maximum working stroke of the table. The inner end 19—19' of each cylinder is fashioned to snugly receive a cooperating hollow plunger 26—26', each of which is rigidly connected to one end of the table 15 through appropriate end brackets 27—27'. The outer end of each plunger 26—26' is closed but the inner end is open to the interior of its coacting cylinder 18—18'. An auxiliary cylinder 28 and 28' is concentrically disposed within each main cylinder 18 and 18'. In this instance each auxiliary cylinder 28 and 28' is formed adjacent its outer end with a flange 29—29' adapted to seat internally against the outer end of its associated cylinder 18—18' and to which it is firmly secured by an appropriate end head 30—30', constituting a closure therefor. The inner end 31—31' of each auxiliary cylinder 28—28' projects into the associated hollow, plunger 26—26' but is preferably radially spaced therefrom so as to maintain communication between this plunger and its coacting cylinder. The inner end 31—31' of each auxiliary cylinder is internally fashioned to snugly receive the inner end of a plunger 32—32', disposed concentrically of each hollow plunger 26—26' and movable therewith. In this instance each plunger 32—32' is removably anchored at its outer end within the associated end bracket 27—27', as indicated at 33—33', so as to insure movement of each pair of plungers 26—32 and 26'—32' as units.

The outer ends of the two auxiliary cylinders 28 and 28' are connected, respectively, with pipes 34 and 35, constituting the opposite sides of a closed hydraulic circuit. The circuit is fed by an appropriate pump 36 preferably of the variable displacement type capable of delivering liquid smoothly and at a predetermined rate irrespective of variations in resistance or pressure. The pump shown is fully described in my copending application, Serial No. 199,925, filed June 20, 1927, which has now matured into Patent No. 1,753,562, issued April 8, 1930. It will suffice here to state that this pump is driven at constant speed through appropriate means such as pulley 37 and delivers liquid smoothly through a pipe 38 at a definite rate dependent upon the setting of a control handle 39. Pipe 38 leads to an appropriate valve 40, which is a part of the pump assembly, and which controls the direction of flow within the pipes 34 and 35. The pump receives liquid through a return pipe 41 leading from the valve 40.

The specific form of valve shown at 40 is fully described in the copending application of Walter Ferris hereinabove identified, and a brief description of its function will suffice for a full and complete understanding of the present invention. The plunger 42 of the valve is adjustable lengthwise into any of five positions. It is shown in an intermediate neutral position, wherein supply pipe 38, leading from the pump, is open to return pipe 41, through the ports 38' and a longitudinal passage in the plunger 42, so that the pump circuit is by-passed and there is no flow of liquid within the pipes 34 and 35, constituting the motor circuit. The table is therefore at rest.

Movement of plunger 42 a predetermined distance toward the left will connect supply pipe 38 with pipe 34 and pipe 35 with return pipe 41, through the ports 38' and longitudinal passage in the plunger 42, so that liquid will be forced through pipe 34 to auxiliary cylinder 28 and liquid will return from auxiliary cylinder 28' through pipes 35 and 41 to the pump. Similarly when valve plunger 42 is shifted a predetermined distance toward the right pipe 35 will be connected with supply pipe 38 and pipe 34 with return pipe 41 so that then auxiliary cylinder 28' will receive liquid under pressure through pipe 35 and liquid will escape from auxiliary cylinder 28 through pipes 34 and 41 to the pump.

Movement of the valve plunger 42 beyond either of the two operating positions just mentioned will not further change the connections between pipes 38, 41, 34 and 35, but will establish pressure within a pipe 43 leading to and controlling a selective valve 44, such as described in the application of Walter Ferris hereinabove identified. That is to say, when the plunger 42 is shifted toward the left until ports 43' communicate with pipe 43, the relatively low pressure continuously maintained within the valve bore is transmitted to pipe 43 through the longitudinal passage in the valve plunger 42 and ports 43'; and when the plunger 42 is shifted toward the right until the left end head thereof passes beyond the pipe 43, this pipe is then exposed to the pressure in the valve bore.

Valve 44 controls pipes 45 and 46, connected with the main cylinders 18 and 18', and pipes 47 and 48, connected with pipes 34 and 35. This valve may assume either of two positions. With the plunger 49 thereof in the left extreme position shown, pipe 45 communicates with pipe 47, so that main cylinder 18, as well as auxiliary cylinder 28, is open to pipe 34, and pipe 46 communicates with pipe 48 so that main cylinder 18', as well as auxiliary cylinder 28', is open to pipe 35. A spring 49' yieldably maintains the valve plunger 49 in this position so long as there is no pressure in pipe 43, so that with the main valve plunger 42 in either of the two working positions first mentioned the two main cylinders 18 and 18', as well as the two auxiliary cylinders 28 and 28', are connected to the discharge and return sides of the pump, respectively. With the pump thus connected to both the main and auxiliary cylinders the table 15 moves at a relatively slow rate and in a direction dependent upon the direction of flow within the pipes 34 and 35. But when pressure is established within pipe 43 by adjustment of the main valve plunger 42 beyond either of the two working positions first mentioned, the plunger 49 of the selective valve is shifted toward the right thereby blocking the pipes 47 and 48 and connecting pipe 45 with pipe 46. The main cylinders 18 and 18' are thus cut out of the main circuit and connected with each other. Under that condition the entire pump discharge is directed to one or the other of the auxiliary cylinders 28 or 28' and the table 15 moves at a relatively rapid rate and in a direction dependent upon the direction of flow in pipes 34 and 35. It will also be noted that under that condition the liquid discharged from one of the main cylinders is directed into the other so that their coacting plungers 26 and 26' are free to idle with the table without offering any material resistance to the movement thereof under the action of the auxiliary cylinders and their coacting plungers 32 and 32'.

It will thus be understood that the plunger 49 of the selective valve normally assumes the position shown, so that, upon movement of the main valve plunger 42 a predetermined distance toward the left, liquid discharged from the pump through pipe 38 is directed through pipe 34 to the auxiliary cylinder 28 and through pipes 47 and 45 to the main cylinder 18 and the table travels toward the left, liquid escaping from the main cylinder 18', through pipes 46, 48 and 35, and from the auxiliary cylinder 28, through pipe 35 and through pipe 41 back to the pump. When the main valve plunger 42 is shifted further in the same direction, pressure is established in pipe 43, so that the plunger 49 of the selective valve is shifted toward the right. The entire flow of liquid in pipe 34 is thus directed to the auxiliary cylinder 28 and the table moves toward the left at a rapid rate, liquid escaping from the auxiliary cylinder 28' through pipes 35 and 41 back to the pump. With valve plunger 49 in this latter position, liquid escaping from the main cylinder 18' flows through pipes 46 and 45 to the main cylinder 18 to maintain the same flooded. Similarly when the main valve plunger 42 is shifted a predetermined distance toward the right both cylinders 18' and 28' are connected to the supply pipe 38 and both cylinders 18 and 28 are connected to the return pipe 41, and the table travels toward the right; and when plunger 42 is shifted further in the same direction the main cylinder 18 discharges into the main cylinder 18', the auxiliary cylinders 28' and 28, alone, being connected to pipes 38 and 41, respectively, so that the table then travels at a rapid rate toward the right. The main valve plunger 42 may be actuated and controlled in various ways, such, for instance, as described in the hereinabove mentioned application of Walter Ferris.

It will be noted that the arrangement of cylinders in staggered overlapping relation, as hereinabove described, provides a maximum table movement within a predetermined operating space. It will also be noted that with the use of compound cylinders, such as described, no packing is necessary for the inner or auxiliary cylinders, although I prefer to provide external packing 50 for the outer cylinders 18 and 18'. The cost of accurate and careful machining is thus largely eliminated with the cylinders constructed and assembled in the manner described.

Various changes may be made in the embodiment of the invention hereinabove specifically described without departing from or sacrificing the advantages of the invention as defined in the appended claims.

I claim:—

1. In a milling machine the combination of a support, a rotary cutter spindle, a table movable on said support in a direction transverse to the axis of rotation of said spindle, a pair of hydraulic rams connected to said support and to the opposite ends of said table, respectively, for driving said table in opposite directions, an auxiliary ram within each of said first named rams, a pump, and a hydraulic circuit fed by said pump, said circuit including valve mechanism selectively operable to connect said pump with said auxiliary rams and with said first named rams to effect operation of said table at different speeds.

2. In a machine of the character described the combination of a support, a table movable lengthwise thereon, a single acting hydraulic ram for moving said table in one direction, an auxiliary ram within said first named ram for moving said table at a different rate in the same direction, another ram for moving said table in the opposite direction, another auxiliary ram within said last named ram for moving said table at a different rate in said last named direction, a pump, and hydraulic connections between said pump and rams, said connections including valve mechanism operable to vary said connections to thereby regulate the rate and direction of motion of said table.

In witness whereof, I hereunto subscribe my name this 15th day of September, 1927.

JOHN P. FERRIS.